United States Patent
Yoon et al.

(10) Patent No.: US 6,849,976 B2
(45) Date of Patent: Feb. 1, 2005

(54) HOUSING STRUCTURE FOR GEARED MOTORS

(75) Inventors: Jin Goon Yoon, Kwonsun-Ku (KR); Nak Sun Choi, Inchon (KR); Sang Hyo Choi, Yeonsu-Ku (KR)

(73) Assignee: SPG Co., LTD, Inchon (KR)

( * ) Notice: Subject to any disclaimer, the term of this patent is extended or adjusted under 35 U.S.C. 154(b) by 143 days.

(21) Appl. No.: 10/282,922

(22) Filed: Oct. 28, 2002

(65) Prior Publication Data

US 2004/0070297 A1 Apr. 15, 2004

(30) Foreign Application Priority Data

Oct. 14, 2002 (KR) ............................ 10-2002-0062453

(51) Int. Cl.[7] .......................... H02K 5/16; H02K 7/08
(52) U.S. Cl. ..................................... 310/90; 310/89
(58) Field of Search ............... 310/89, 90, 91, 310/75 R (56) References Cited

U.S. PATENT DOCUMENTS

| | | | | |
|---|---|---|---|---|
| 4,369,387 A | * | 1/1983 | Haar et al. ..................... | 310/83 |
| 4,504,754 A | * | 3/1985 | Stone ........................... | 310/90 |
| 4,763,031 A | * | 8/1988 | Wang ........................... | 310/83 |
| 4,920,289 A | * | 4/1990 | Saito ............................ | 310/90 |
| 5,126,609 A | * | 6/1992 | Shimono et al. ............... | 310/83 |
| 5,913,548 A | * | 6/1999 | Keck ............................ | 29/596 |
| 5,952,754 A | * | 9/1999 | Mok ............................. | 310/91 |
| 6,700,254 B2 | * | 3/2004 | Wong ........................... | 310/89 |

OTHER PUBLICATIONS

Seiji, et al. "Speed reducer and geared motor", *Patent Abstracts of Japan*, (2002).

* cited by examiner

*Primary Examiner*—Burton Mullins
(74) *Attorney, Agent, or Firm*—Bret Field; Susan Tall; Bozicevic, Field & Francis LLP (57) ABSTRACT

A housing structure for geared motors is disclosed. The housing structure is designed to seal the spaces between a stator core and first and second housings to prevent infiltration of moisture and impurities to a motor's drive part through the spaces or formation and growth of ice on the drive part, thus the motor always being smoothly started in its operation, without having a high drive torque undesirably increased to remove ice or impurities from the drive part. The first housing has a support part functioning to rotatably support a first end of the rotating shaft on the stator core, while the second housing has a cup part functioning to rotatably support a second end of the rotating shaft on the stator core. The support part of the first housing includes a first spherical bearing, a first seat part, and a bearing seat. The first housing also has a cylindrical part assembled with the stator core, and a shaft hole rotatably supporting an output shaft of the motor. The cup part of the second housing includes a main depression, a central bearing seat, a cylindrical second seat part, a chamfered part, a second spherical bearing, a spring-biased support plate, and a cover.

6 Claims, 10 Drawing Sheets

HOUSING STRUCTURE FOR GEARED MOTORS

BACKGROUND OF THE INVENTION

1. Field of the Invention

The present invention relates, in general, to geared motors preferably used in a variety of electric appliances, such as built-in ice crushers of refrigerators, and, more particularly, to a housing structure for such geared motors, which is designed to prevent formation and growth of ice on the motor's drive part and thereby prevent operation of the motor's drive part from being impeded by the ice which disturbs a smooth starting of the motor.

2. Description of the Prior Art

In accordance with diversification in eating habits, many users of refrigerators want to take crushed ice as well as ice cubes from their refrigerators, and so several refrigerators, each having a built-in icemaker and a built-in ice crusher, have been proposed and used. An example of conventional ice crushers, which is preferably used with a built-in icemaker of a refrigerator to produce crushed ice, is disclosed in Korean Utility Model Registration No. 20-267521.

Figure 1:
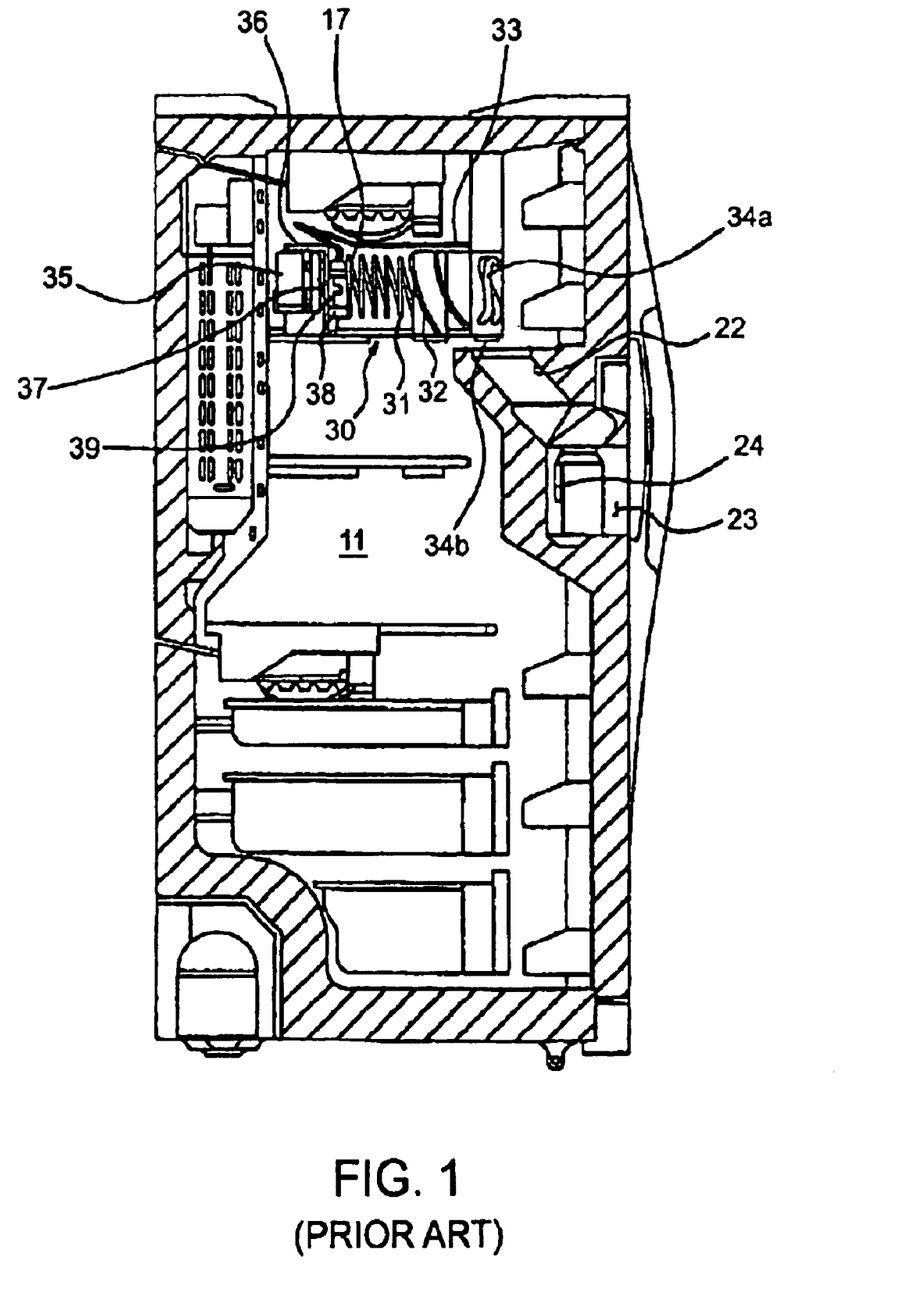
FIG. 1 is a side sectional view of a refrigerator provided with a built-in ice crusher.
Figure 2:
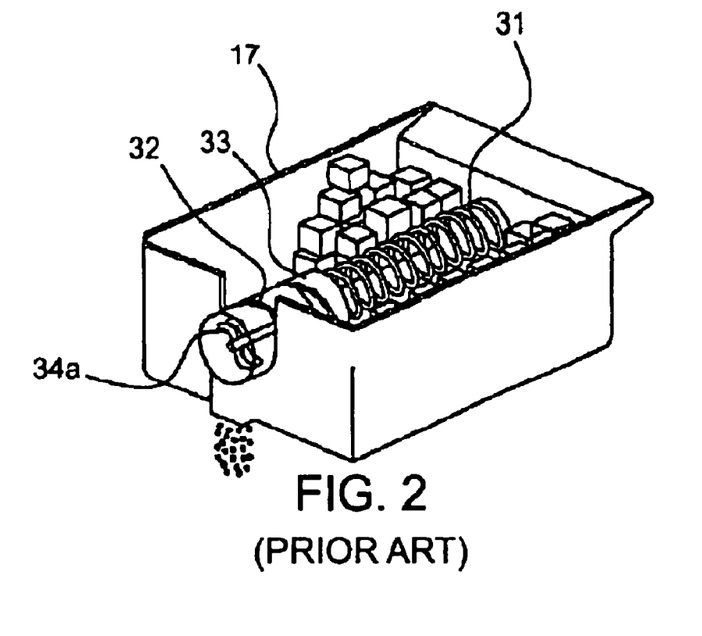
FIGS. 2 and 3 are front and rear perspective views, respectively, showing construction and operation of a conventional ice crusher for refrigerators.
Figure 3:
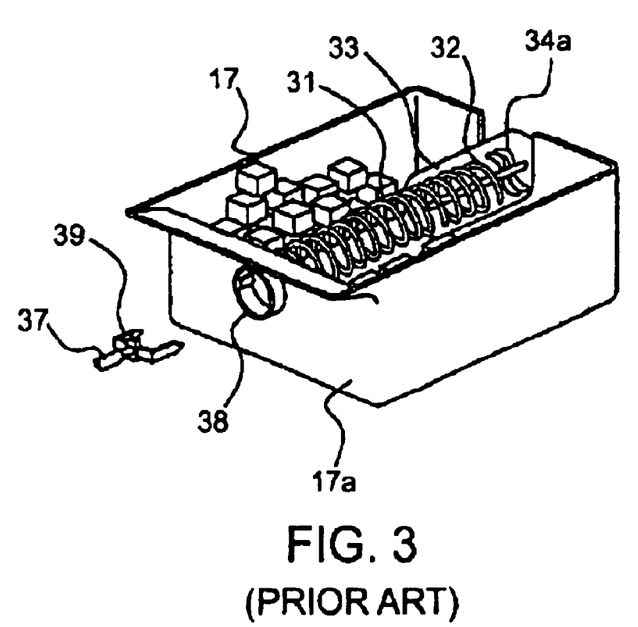

As shown in FIGS. 1 to 3, the Korean ice crusher for refrigerators comprises a shading coil motor 35, a reduction gearbox unit that is connected to the motor 35, a motor housing 36 that encases both the motor 35 and the reduction gearbox unit, and a connecting member 39 that is connected to an output shaft 37 of the reduction gearbox unit. An ice container 17 is included in the ice crusher to contain ice tubes therein. A rotor 38 is installed at an opening formed at the rear wall 17a of the ice container 17, such that the rotor 38 is rotated along with the connecting member 39 by a rotating force of the motor 35. An ice feeder 31 having a coil spring shape is longitudinally arranged in the ice container 17, with its rear end connected to the rotor 38 such that the ice feeder 31 is rotated around its axis along with the rotor 38 to feed ice cubes toward the front of the container 17. An ice guide tube 33, having a spiral guide groove on its inner surface, is longitudinally arranged at the front portion of the ice container 17, with the ice feeder 31 being axially received at its front portion in the spirally grooved rear portion of the guide tube 33 to guide ice cubes to the front of the guide tube 33. An ice crushing means 34a is rotatably set in the front portion of the guide tube 33, and crushes ice cubes guided thereto by the ice feeder 31 to produce crushed ice.

The above ice crusher is operated as follows. When a user inserts a cup into an ice dispensing recess 23 to position the cup under a dispensing port while pushing a switch 24, the switch 24 is turned on to start an ice feeding and ice crushing operation of the ice crusher. That is, the motor 35 starts its rotation, so that the ice feeder 31 is rotated to feed ice cubes contained in the ice container 17 to the ice crushing means 34a that crushes the ice cubes. The crushed ice from the ice crushing means 34a passes through a dispensing path 22, which extends from the interior to the exterior of the freezing compartment 11 of the refrigerator, and is dispensed into the cup through the dispensing port. When the user removes the cup containing a desired amount of the crushed ice from the dispensing recess 23, the switch 24 is elastically restored to its off-position, so that the ice crusher stops the ice feeding and ice crushing operation.

Figure 4:
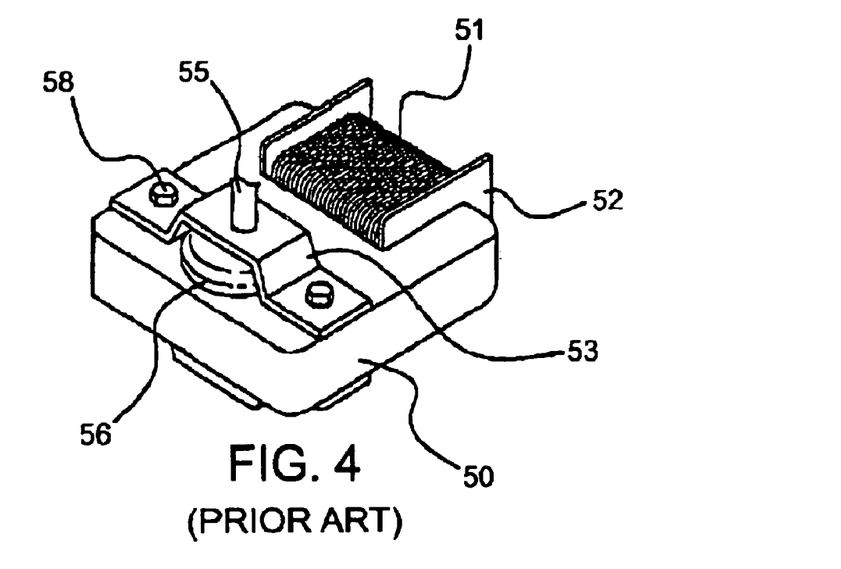
FIG. 4 is a perspective view, showing a housing structure of a conventional shading coil motor used in ice crushers of refrigerators.
Figure 5:
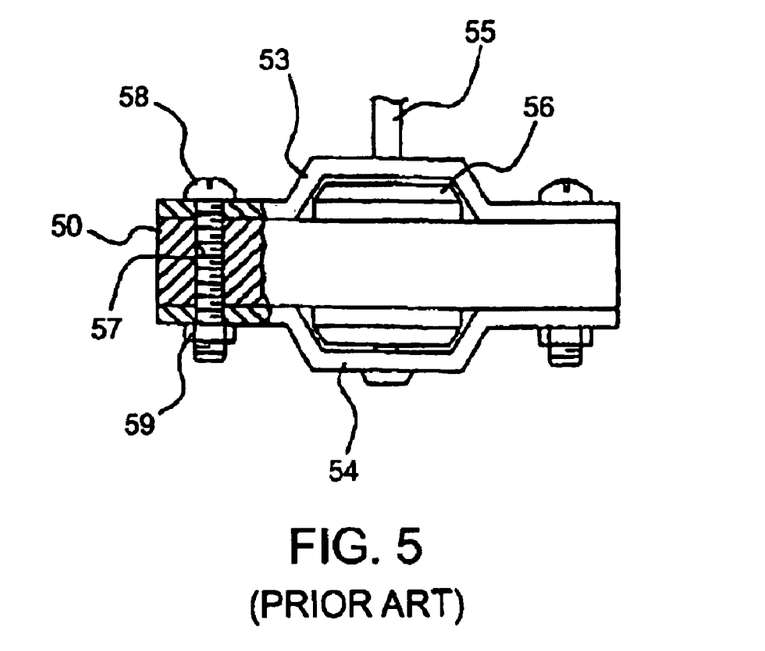
FIG. 5 is a sectional view of the shading coil motor of FIG. 4.

Such a shading coil motor is advantageous in that it has a small size and a simple construction, so that the shading coil motor has been preferably used as a fan motor for refrigerators. As shown in FIGS. 4 and 5, the conventional shading coil motor comprises a stator core 50 and a rotor 56. The stator core 50 has a rectangular shape, with a bobbin 52 wound with a coil 51 and mounted to a part of the stator core 50 while surrounding the part of the core 50. The rotor 56 comprises first and second housings 53 and 54 and a rotating shaft 55. The first and second housings 53 and 54 are respectively mounted to the upper and lower surfaces of the stator core 50 at positions opposite to the bobbin 52, and the rotating shaft 55 vertically passes through the stator core 50 and is rotatably supported by the first and second housings 53 and 54.

In order to mount the first and second housings 53 and 54 to the upper and lower surfaces of the stator core 50, two through holes 57 are vertically formed in the stator core 50 at predetermined positions and two mounting holes are formed at both ends of each housing 53, 54 at positions corresponding to the two through holes 57. The mounting of the upper and lower housings 53 and 54 to the stator core 50 is accomplished by positioning the two housings 53 and 54 on the upper and lower surfaces of the stator core 50 such that the mounting holes of the housings 53 and 54 are aligned with the through holes 57, and mounting the housings 53 and 54 to the core 50 by using nuts 59 and bolts 58.

However, the housing structure of the conventional shading coil motor is problematic in that it may undesirably allow impurities to infiltrate into a space between the stator core 50 and each of the first and second housings 53 and 54 to cause malfunctioning of the motor. Particularly, when such a shading coil motor is used in a freezing compartment of a refrigerator, moisture is collected in the space between the stator core 50 and each of the first and second housings 53 and 54 due to a substantial difference in temperature between the on- and off-states of the motor, and the collected moisture freezes to become ice nodules which may cause several problems in the operation of the motor. For example, the ice nodules disturb a rotation of the rotating shaft 55 relative to the stator core 50, thus impeding smooth operation of the drive part of the motor including the rotating shaft 55.

Conventional built-in ice crushers for refrigerators typically use shading coil motors of FIG. 4, and such shading coil motors do not perform a rotation in a reverse direction, but only perform a rotation in a forward direction due to their intrinsic limitations. Therefore, in an effort to remove such ice nodules from the drive part, several shading coil motors with increased capacities have been proposed and used. The increase in the capacity of a shading coil motor may be achieved by increasing the drive torque of the motor and installing an additional enclosure to the motor. However, such an increase in the motor capacity is undesirably accompanied by an increase in the thickness of the stator core, makes the process of producing the motor complex due to installation of the enclosure, increases the size of the ice crusher, and increases the consumption of electric power. The increased motor capacity also results in an increase in the production cost of the motor.

SUMMARY OF THE INVENTION

Accordingly, the present invention has been made keeping in mind the above problems occurring in the prior art, and an object of the present invention is to provide a housing structure for geared motors preferably used in a variety of electric appliances, such as built-in ice crushers of refrigerators, which is designed to seal the spaces between a stator core and first and second housings to prevent infiltration of moisture and impurities to a drive part through the spaces or formation and growth of ice on the drive part, thus the motor always being smoothly started in its operation, without having a high drive torque undesirably increased to remove ice or impurities from the drive part.

In order to accomplish the above objects, the present invention provides a housing structure for geared motors, comprising a stator core, a rotor, a rotating shaft rotated along with the rotor, and first and second housings rotatably supporting the rotating shaft to the stator core, wherein the first housing comprises a support part functioning to rotatably support a first end of the rotating shaft on the stator core, and the second housing comprises a cup part functioning to rotatably support a second end of the rotating shaft on the stator core.

The support part of the first housing comprises a first spherical bearing having a central hole for receiving the first end of the rotating shaft so as to rotatably support the rotating shaft relative to the support part, a first seat part functioning to receive a part of the first spherical bearing, a bearing seat functioning to hold both the first spherical bearing and the first seat part, and a bearing support plate functioning to support the bearing seat and the part of the spherical bearing. The first housing also has a cylindrical part which is provided around the support part and assembled with the stator core while coming into contact with an upper surface of the stator core such that the cylindrical part thus seals the rotating shaft, and a shaft hole which rotatably supports an output shaft that is included in the motor to be rotated by a gear train housed in a gearbox unit of the first housing, so that the output shaft transmits a rotating force of the rotating shaft to a target device requiring the rotating force.

The cup part of the second housing comprises a main depression defining an opening in the cup part, a central bearing seat formed by forming a depression at a predetermined central area on a bottom of the main depression, and seating a slide bearing therein to rotatably support the second end of the rotating shaft, a cylindrical second seat part formed on the bottom of the main depression while defining the central bearing seat therein, a chamfered part formed by chamfering an upper edge of an inner surface of the cylindrical second seat part, a second spherical bearing formed through a powder compacting and sintering process, and seated at a lower part thereof on the chamfered part, a spring-biased support plate laid on an upper part of the second spherical bearing seated on the chamfered part, thus elastically holding the second spherical bearing, and a cover mounted along an outside edge thereof in the cup part through a caulking process to cover all elements installed in the cup part, with a spring being interposed between the spring-biased support plate and the cover to bias the support plate in a direction, whereby each of the second spherical bearing, the spring-biased support plate and the cover has a central hole through which the rotating shaft is inserted.

BRIEF DESCRIPTION OF THE DRAWINGS

The above and other objects, features and other advantages of the present invention will be more clearly understood from the following detailed description taken in conjunction with the accompanying drawings, in which:

FIGS. 11a and 11b are views of the first housing of the housing structure according to the present invention, in which.

FIGS. 14a and 14b are views of a second housing constituting the housing structure of the present invention, in which.

DETAILED DESCRIPTION OF THE INVENTION

Reference should now be made to the drawings, in which the same reference numerals are used throughout the different drawings to designate the same or similar components.

Figure 6:
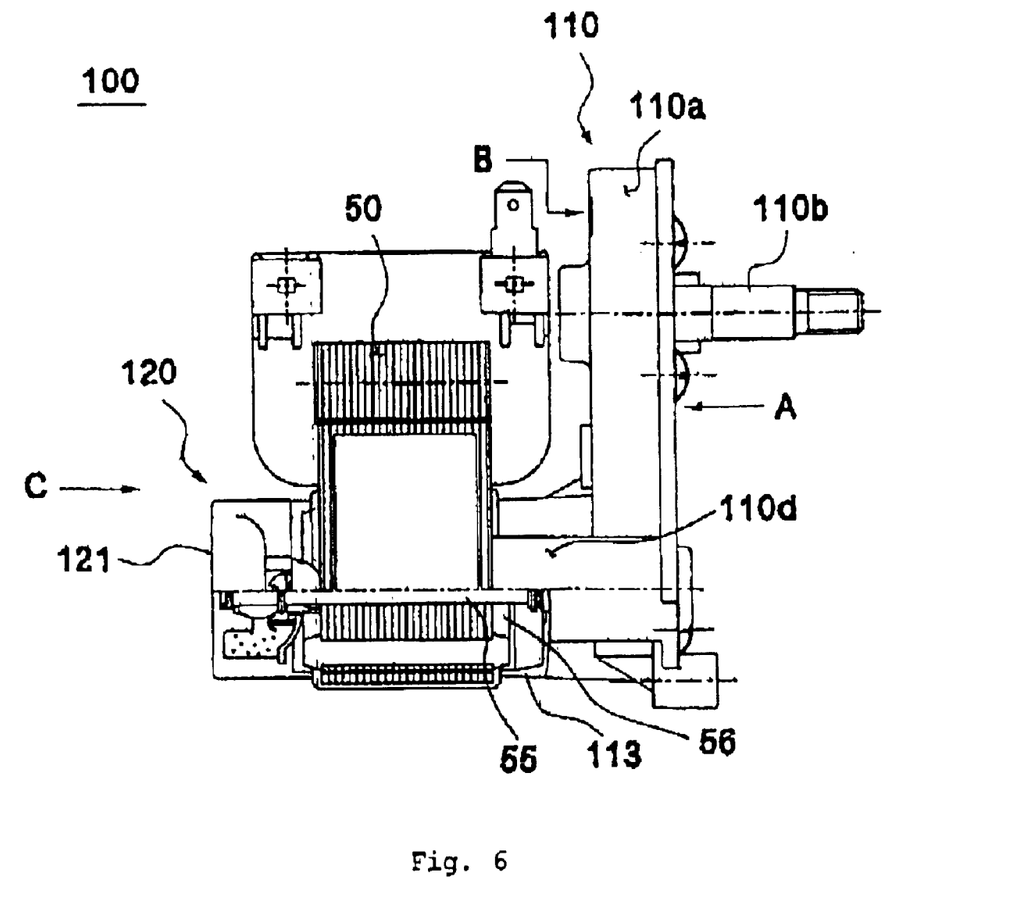
FIG. 6 is a partially sectioned view of a housing structure of a geared motor preferably used in built-in ice crushers of refrigerators, in accordance with a preferred embodiment of the present invention.
Figure 7:
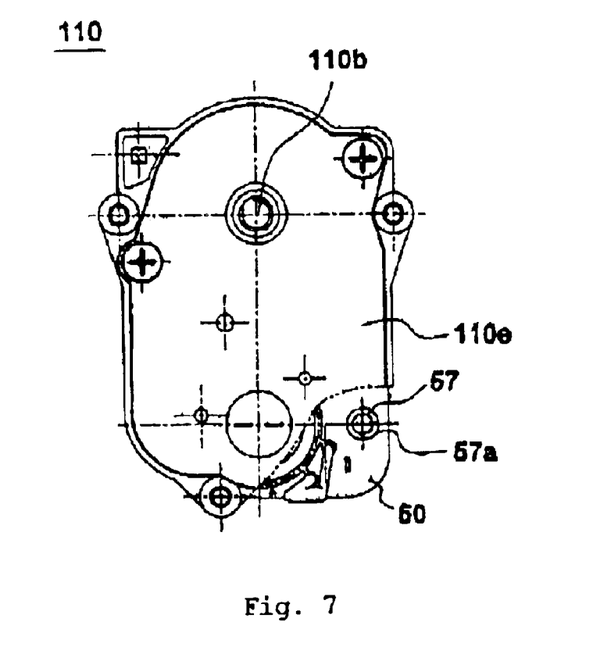
FIG. 7 is a side view of an end plate included in a first housing constituting the housing structure of the present invention, viewed in a direction as shown by the arrow "A" of FIG. 6, the end plate functioning to cover a reduction gearbox unit of the geared motor.
Figure 8:
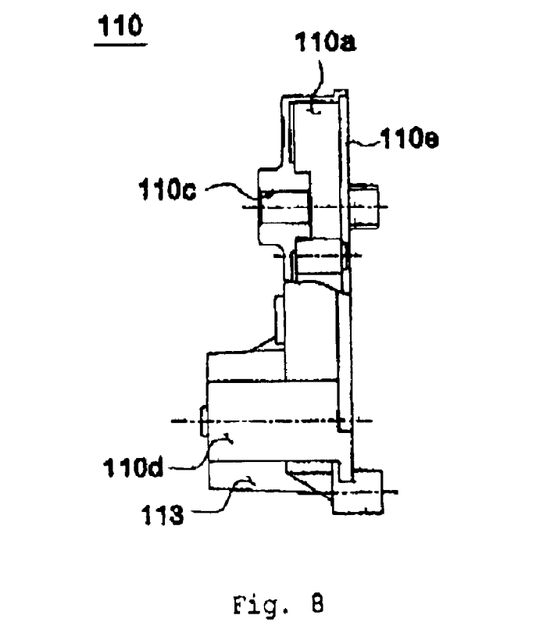
FIG. 8 is a sectional view of a part of the first housing constituting the housing structure of the present invention.
Figure 9:
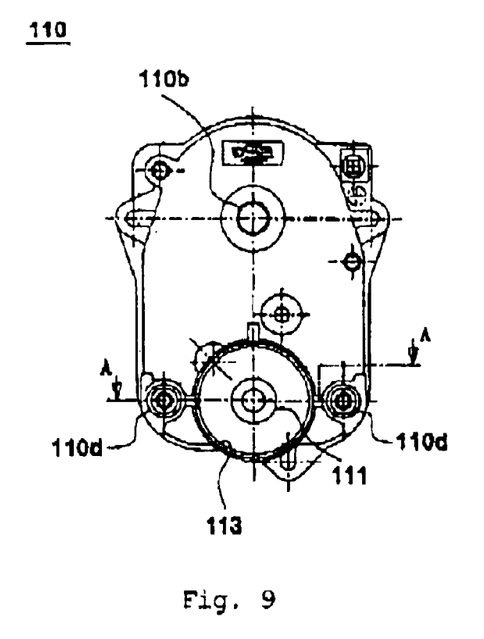
FIG. 9 is a top plan view of the first housing constituting the housing structure of the present invention, viewed in a direction as shown by the arrow "B" of FIG. 6.
Figure 10:
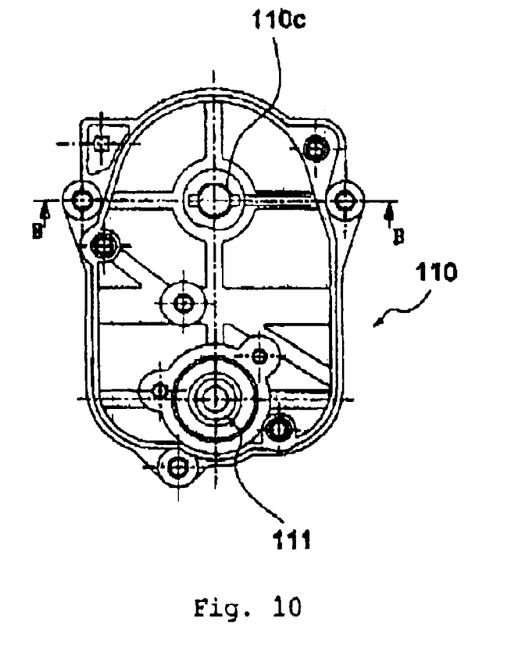
FIG. 10 is a side view, showing the internal construction of the reduction gearbox unit, with the end plate of FIG. 7 being removed from the first housing of the housing assembly according to the present invention.
Figure 11A:
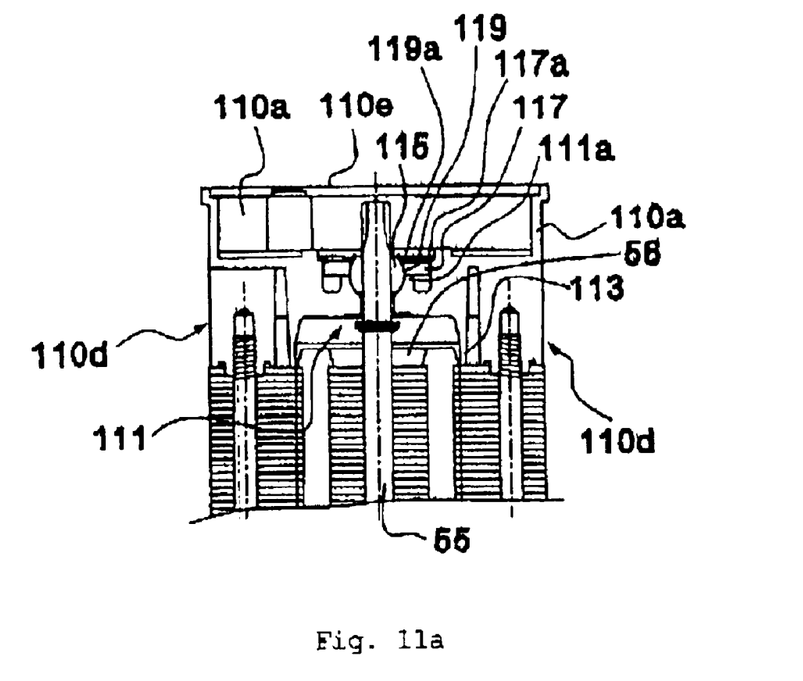
FIG. 11a is a sectional view taken along the line A—A of FIG. 9 to show a support unit of the first housing and some elements placed around the support unit.
Figure 11B:
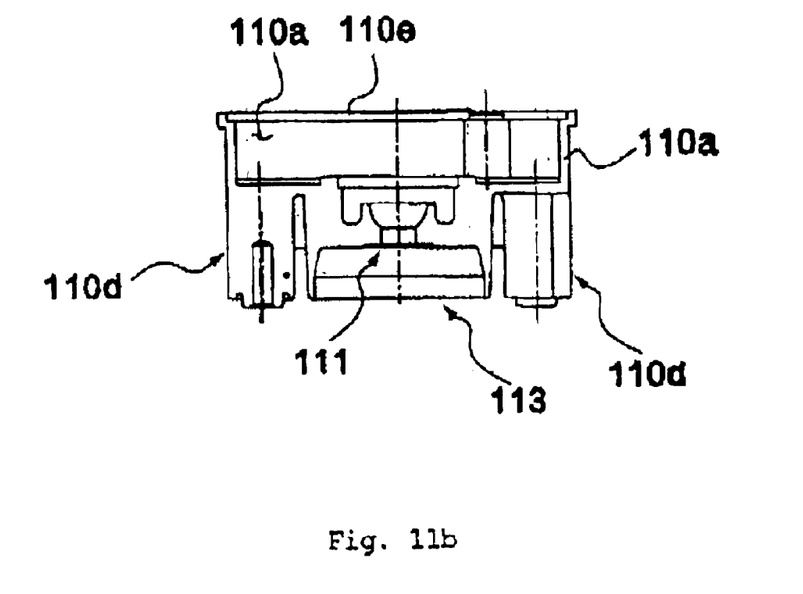
FIG. 11b is a view showing a part of the first housing.
Figure 12:
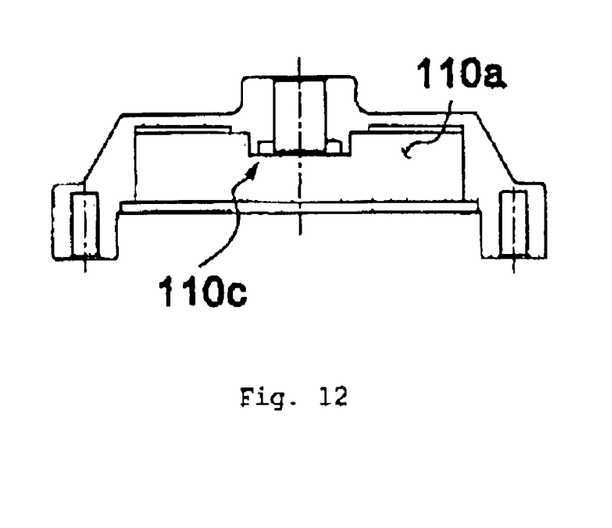
FIG. 12 is a sectional view taken along the line B—B of FIG. 10 to show a shaft hole of the first housing.
Figure 13:
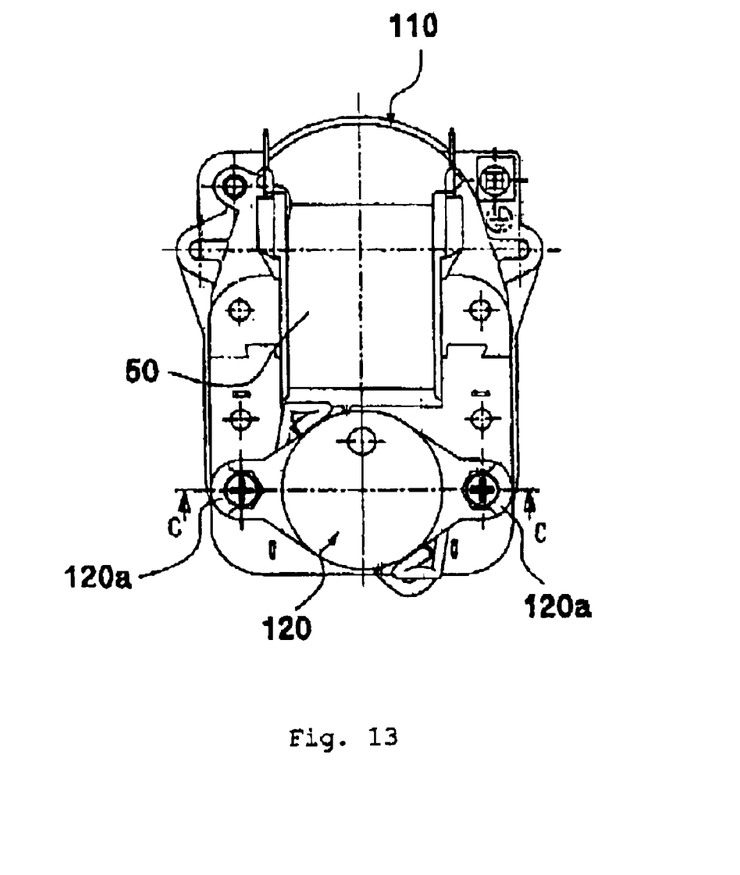
FIG. 13 is a bottom view of the first housing constituting the housing structure of the present invention, viewed in a direction as shown by the arrow "C" of FIG. 6.
Figure 14A:
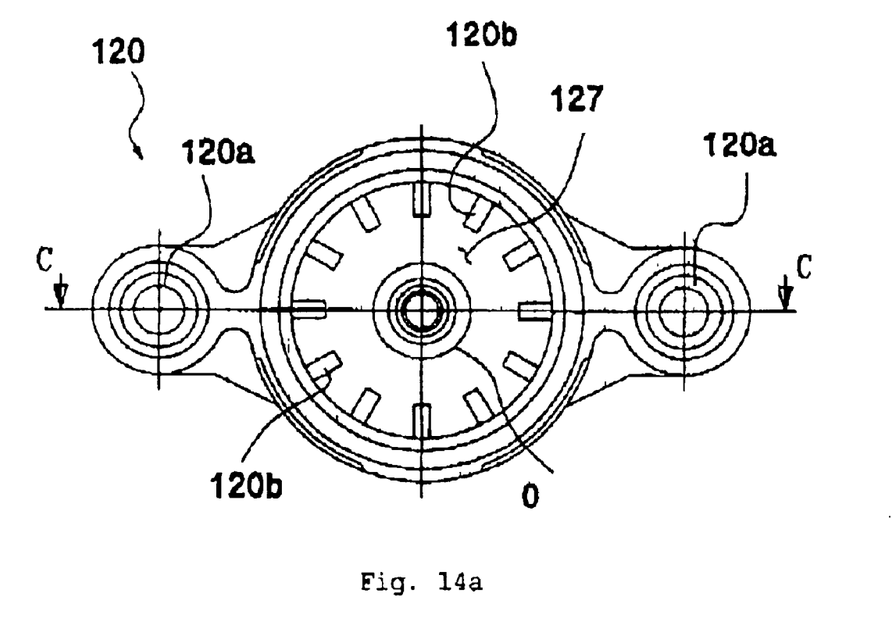
FIG. 14a is a plan view showing the interior of the second housing.
Figure 14B:
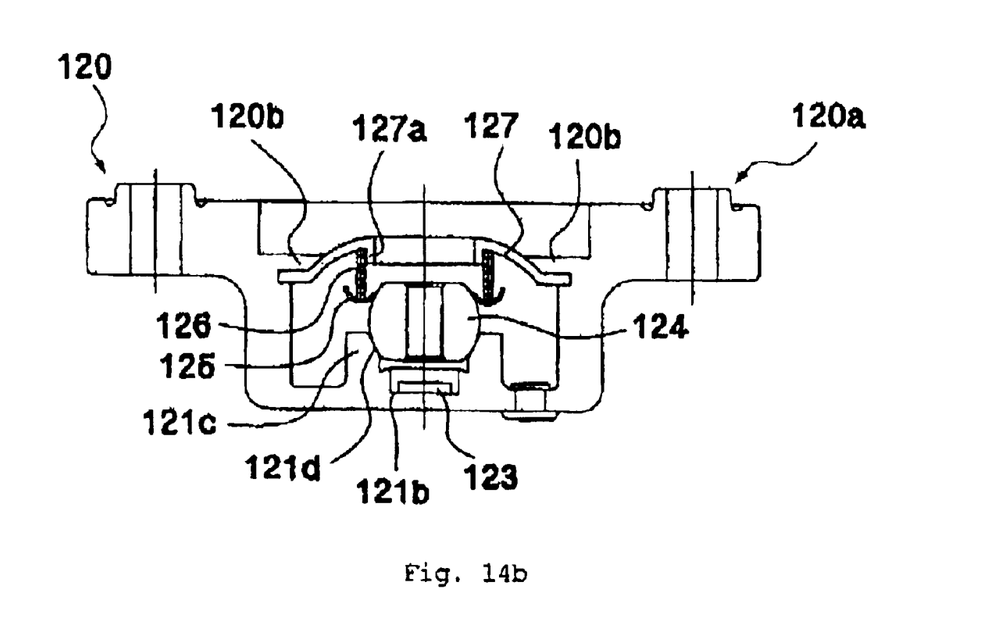
FIG. 14b is a sectional view taken along the line C—C of FIG. 13 or FIG. 14a to show the construction of the second housing.
Figure 15:
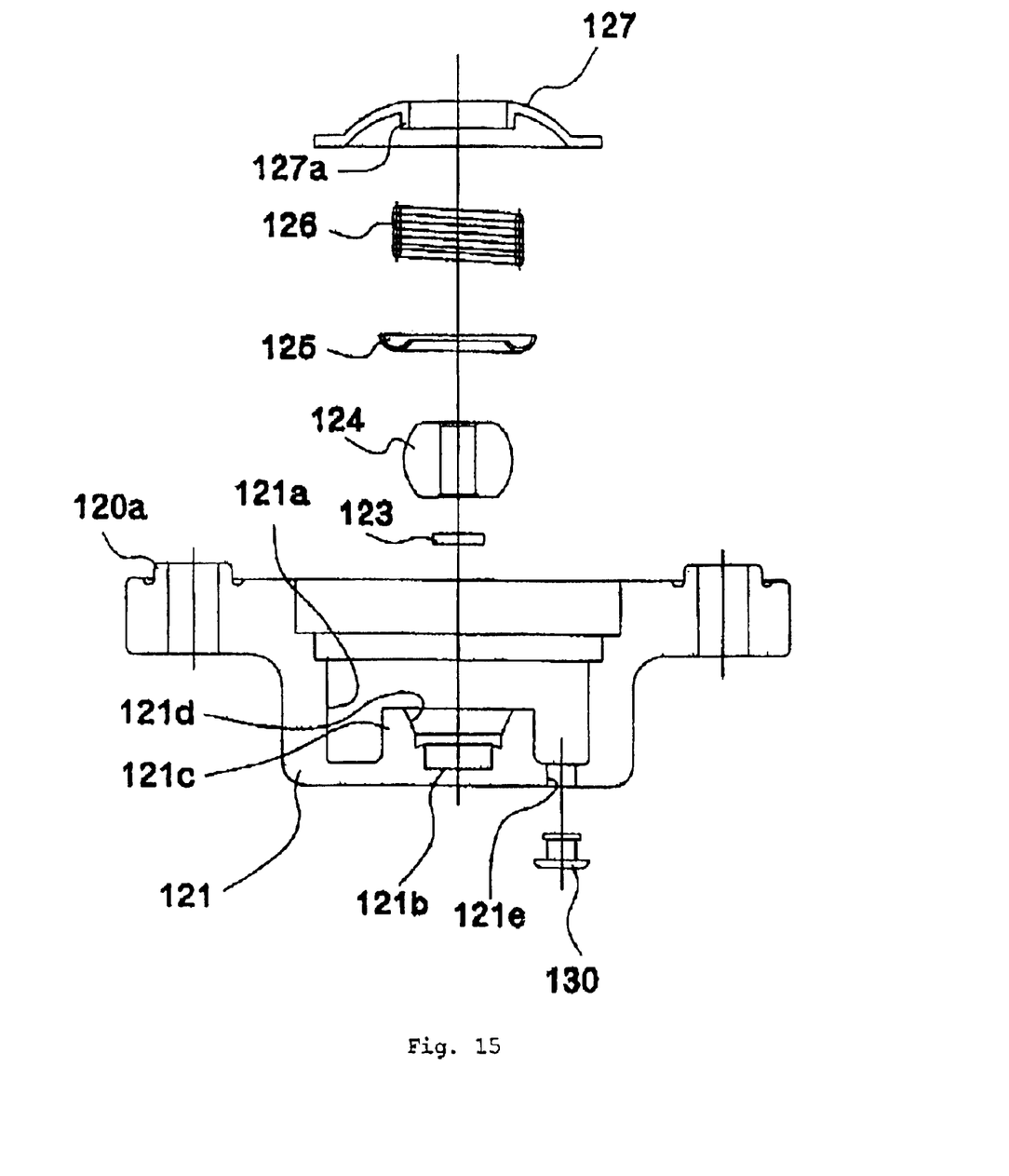
FIG. 15 is an exploded view of the second housing constituting the housing structure of the present invention, showing elements of the second housing.

FIG. 6 is a partially sectioned view of a housing structure of a geared motor preferably used in built-in ice crushers of refrigerators, in accordance with a preferred embodiment of the present intention. FIG. 7 is a side view of an end plate included in a first housing constituting the housing structure, viewed in a direction as shown by the arrow "A" of FIG. 6, the end plate functioning to cover a reduction gearbox unit of the geared motor. FIG. 8 is a sectional view of a part of the first housing constituting the housing structure. FIG. 9 is a top plan view of the first housing constituting the housing structure, viewed in a direction as shown by the arrow "B" of FIG. 6. FIG. 10 is a side view, showing the internal construction of the gearbox unit, with the end plate of FIG. 7 being removed from the first housing of the housing assembly. FIGS. 11a and 11b are views of the first housing of the housing structure, in which: FIG. 11a is a sectional view taken along the line A—A of FIG. 9 to show a support part of the first housing and some elements placed around the support part, and FIG. 11b is a view showing a part of the first housing. FIG. 12 is a sectional view taken along the line B—B of FIG. 10 to show a shaft hole of the first housing. FIG. 13 is a bottom view of the first housing constituting the housing structure, viewed in a direction as shown by the arrow "C" of FIG. 6. FIGS. 14a and 14b are views of a second housing constituting the housing structure, in which: FIG. 14a is a plan view showing the interior of the second housing, and FIG. 14b is a sectional view taken along the line C—C of FIG. 13 to show the construction of the second housing. FIG. 15 is an exploded view of the second housing constituting the housing structure, showing elements of the second housing.

In the drawings, the reference numeral 100 denotes a shading coil motor of the present invention, which comprises a stator core 50 and a rotor 56, with a rotating shaft 55 rotated along with the rotor 56. The shading coil motor 100 also has first and second housings 110 and 120 that rotatably support the rotating shaft 55 on the stator core 50.

The first housing 110 comprises a support part 111 and a cylindrical part 113. The support part 111 rotatably supports a first end of the rotating shaft 55 of the rotor 56 on the stator core 50. The cylindrical part 113 is positioned around the support part 111, and is assembled with the stator core 50 while coming into contact with an upper surface of the stator core 50. The cylindrical part 113 thus seals the rotating shaft 55. The first housing 110 also has a shaft hole 110c that rotatably supports an output shaft 110b. The output shaft 110b is rotated by a gear train (not shown) that is housed in a reduction gearbox unit 110a of the first housing 110, so that the output shaft 110b transmits a rotating force of the rotating shaft 55 to a target device requiring the rotating force.

The support part 111 of the first housing 110 comprises a first spherical bearing 115, a bearing seat 117, and a bearing support plate 119. The first spherical bearing 115 has a central hole for receiving the first end of the rotating shaft 55 so as to rotatably support the rotating shaft 55 relative to the support part 111, and a part of the spherical bearing 115 is received in a first seat part 111a. The bearing seat 117 holds the first spherical bearing 115 and the first seat part 111a, and the bearing support plate 119 supports the bearing seat 117 and the part of the spherical bearing 115.

The bearing seat 117 has a first curved contact part 117a that receives the part of the first spherical bearing 115 while coming into contact with the bearing 115. The bearing support plate 119 has a second curved contact part 119a which elastically holds the part of the first spherical bearing 115.

Each of the first spherical bearing 115, the bearing seat 117 and the bearing support plate 119 has a central hole "O" through which the rotating shaft 55 is inserted.

The second housing 120 comprises a cup part 121 that rotatably supports a second end of the rotating shaft 55 of the rotor 56 on the stator core 50.

The cup part 121 of the second housing 120 comprises a main depression 121a that defines an opening in the cup part 121. A central bearing seat 121b is formed by depressing a predetermined central area on the bottom of the depression 121a, and seats a slide bearing 123 that rotatably supports the second end of the rotating shaft 55. A cylindrical second seat part 121c is formed on the bottom of the main depression 121a while defining the central bearing seat 121b therein. The upper edge of the inner surface of the cylindrical second seat part 121c is chamfered to form a chamfered part 121d. A second spherical bearing 124, formed through a powder compacting and sintering process, is seated at a lower part thereof on the chamfered part 121d of the second seat part 121c. A spring-biased support plate 125 is laid on an upper part of the second spherical bearing 124 seated on the chamfered part 121d of the second seat part 121c, thus elastically holding the second spherical bearing 124. A cover 127 is mounted along its outside edge in the cup part 121 through a caulking process while covering the elements installed in the cup part 121 of the second housing 120, with a spring 126 being interposed between the support plate 125 and the cover 127 to normally bias the support plate 125 in a direction.

Each of the second spherical bearing 124, the spring-biased support plate 125 and the cover 127 has a central hole "O" through which the rotating shaft 55 is inserted.

A downward tubular bush 127a, having a predetermined length, is axially formed around the edge of the central hole "O" of the cover 127, so that the tubular bush 127a surrounds a part of the rotating shaft 55.

The spring-biased support plate 125 is specifically bent to have a predetermined curved cross-section.

In order to allow a user to check the operational conditions of the elements installed in the main depression 121a of the cup part 121 and to charge lubricating oil into the depression 121a when necessary, the cup part 121 has an oil hole 121e. The oil hole 121e of the cup part 121 is closed by a sealing cap 130 for preventing leakage of oil from the depression 121a through the oil hole 121e.

As described above, the cover 127 is caulked along its outside edge in the cup part 121 of the second housing 120. In order to caulk the cover 127 in the cup part 121, the cup part 121 is processed along an upper edge of the depression 121a to form a plurality of caulking pieces 120b, and, thereafter, the edge of the cover 127 is caulked in the cup part 121 by the caulking pieces 120b.

In order to assemble the first and second housings 110 and 120 into a single structure, with the stator core 50 set between the two housings 110 and 120, the first housing 110 has two first boss parts 110d, while the second housing 120 has two second boss parts 120a. When assembling the shading coil motor 100 of the present invention, the first and second housings 110 and 120 are arranged with the stator core 50 being placed at a predetermined position between the two housings 110 and 120. Thereafter, the two housings 110 and 120 are assembled into a single structure using nuts and bolts which are tightened together at the boss parts 110d and 120a.

In the second housing 120, the second spherical bearing 124 and the cover 127 may be made of a nonmagnetic metal, such as copper or aluminum. Alternatively, the bearing 124 and the cover 127 may be made of a magnetically inducible material.

In the drawings, the reference numeral 110e denotes an end plate which is included in the first housing 110 to cover the reduction gearbox unit 110a having the gear train (not shown). The reference numeral 57 of FIG. 7 denotes two through holes that are formed on the stator core 50 at positions corresponding to the first and second boss parts 110d and 120a. The reference numeral 57a denotes a depressed seat which is formed along each edge of each through hole 57 to allow the ends of the first and second boss parts 110d and 120a to be closely inserted into the through holes 57 when assembling the first and second housings 110 and 120 into a single structure with the stator core 50 interposed between the two housings 110 and 120 using the nuts and bolts.

The operation and effect of the geared motor of the present invention will be described herein below with reference to the accompanying drawing.

When a user turns on a switch using a cup to start an ice feeding and ice crushing operation of an ice crusher, the motor 100 begins operating, so that the stator core 50 is primarily turned on, and rotates the rotating shaft 55. The rotating force of the rotating shaft 55 is transmitted to the output shaft 110b of the first housing 110 through the reduction gearbox unit 110a, thus being outputted from the motor 100 through the output shaft 110b.

When the output shaft 110b is rotated, a connecting member 39, directly connected to the output shaft 110b, is rotated. A rotor 38, installed at an opening formed at the rear wall 17a of an ice container 17 such that the rotor 38 is rotated along with the connecting member 39 by a rotating force of the motor 110, is thus rotated. The construction of the ice crusher used with the motor 100 of the present invention is referred to FIGS. 1 to 3.

In such a case, the second end of the rotating shaft 55, connected to the output shaft 110b through the gear train (not shown) of the reduction gearbox unit 110a, is rotatably supported by the elements set in the second housing 120. That is, the second end of the rotating shaft 55 is supported by both the second spherical bearing 124 and the spring 126. The second spherical bearing 124, set in the cup part 121 of the second housing 120, acts as a radial bearing which allows a rotation of the shaft 55 while preventing an undesired removal of the shaft 55 from the second housing 120. The spring 126 elastically and movably supports the second end of the rotating shaft 55 in the cup part 121 of the second housing 120, thus acting as a thrust bearing for the rotating shaft 55.

In order to prevent an undesired removal of the rotating shaft 55 from the second housing 120, the slide bearing 123 rotatably supports the second end of the rotating shaft 55. Therefore, the rotating shaft 55 is thus smoothly rotated without being displaced from its position in the motor 100.

When the shading coil motor 100 of the present invention is used with a built-in ice crusher installed in a freezing compartment of a refrigerator, the motor's drive part is always maintained at a sealed state inside the first and second housings 110 and 120 assembled into a single structure with the stator core 50 interposed between the two housings 110 and 120. Therefore, moisture and impurities are not collected in the motor's drive part regardless of a substantial difference in temperature between on- and off-states of the motor 100, and so the housing structure of the motor 100 reliably prevents formation and growth of ice on the drive part and thereby prevents operation of the drive part from being impeded by the ice which may disturb a smooth starting of the motor. Therefore, the motor 100 always smoothly starts without malfunctioning or stalling.

As described above, the present invention provides a housing structure for geared motors that are preferably used as drive motors for a variety of electric appliances, such as built-in ice crushers of refrigerators. In the motor's housing structure of the present invention, first and second housings are assembled into a single structure with a stator core interposed between the two housings, such that a motor's drive part is always maintained at a sealed state inside the stator core and the two housings while being prevented from infiltration of moisture and impurities thereto or formation and growth of ice thereon. The motor is thus always smoothly started in its operation, without having a high drive torque undesirably increased to remove ice or impurities from the drive part.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A housing structure for geared motors, comprising a stator core, a rotor, a rotating shaft rotated along with the rotor, and first and second housings rotatably supporting the rotating shaft to the stator core, wherein said first housing comprises:
a support part functioning to rotatably support a first end of said rotating shaft on the stator core, said support part comprising:
a first spherical bearing having a central hole for receiving the first end of the rotating shaft so as to rotatably support said rotating shaft relative to the support part;
a first seat part functioning to receive a part of said first spherical bearing;
a bearing seat functioning to hold both said first spherical bearing and said first seat part; and
a bearing support plate functioning to support said bearing seat and a part of said first spherical bearing;
a cylindrical part provided around said support part, and assembled with said stator core while coming into contact with an upper surface of the stator core such that said cylindrical part thus seals the rotating shaft; and
a shaft hole functioning to rotatably support an output shaft, said output shaft being included in the motor to be rotated by a gear train housed in a gearbox unit of the first housing, so that the output shaft transmits a rotating force of the rotating shaft to a target device requiring the rotating force.

2. The housing structure according to claim 1, wherein said bearing seat of the support part comprises a first curved contact part functioning to receive a part of the first spherical bearing while coming into contact with said first spherical bearing; and
said bearing support plate comprises a second curved contact part functioning to elastically hold a part of the first spherical bearing.

3. The housing structure according to claim 1, wherein said second housing comprises:
a cup part functioning to rotatably support a second end of said rotating shaft on said stator core, said cup part comprising:
a main depression defining an opening in said cup part;
a central bearing seat formed by forming a depression at a predetermined central area on a bottom of said main depression, and seating a slide bearing therein to rotatably support the second end of said rotating shaft;
a cylindrical second seat part formed on the bottom of said main depression while defining said central bearing seat therein;
a chamfered part formed by chamfering an upper edge of an inner surface of said cylindrical second seat part;
a second spherical bearing formed through a powder compacting and sintering process, and seated at a lower part thereof on said chamfered part;
a spring-biased support plate laid on an upper part of said second spherical bearing seated on the chamfered part, thus elastically holding the second spherical bearing; and a cover mounted along an outside edge thereof in the cup part through a caulking process to cover all elements installed in said cup part, with a spring being interposed between said spring-biased support plate and said cover to bias the support plate in a direction, whereby each of said second spherical bearing, said spring-biased support plate and said cover has a central hole through which said rotating shaft is inserted.

4. The housing structure according to claim 3, wherein a tubular bush, having a predetermined length, is formed around an edge of the central hole of said cover in an axial direction of the rotating shaft, such that the tubular bush surrounds a part of said rotating shaft.

5. The housing structure according to claim 3, wherein said spring-biased support plate is bent to have a predetermined curved cross-section.

6. The housing structure according to claim 3, wherein said cup part comprises an oil hole allowing a checking of operational conditions of all elements installed in said main depression of the cup part, and allowing a charging of lubricating oil into the main depression, said oil hole of the cup part being closed by a sealing cap.

* * * * *